US012748848B2

(12) United States Patent
Agarwal et al.

(10) Patent No.: US 12,748,848 B2
(45) Date of Patent: Sep. 29, 2026

(54) TECHNIQUES FOR ENFORCING CONFIGURATION REQUIREMENTS FOR APPLICATION-SPECIFIC INTEGRATED CIRCUITS (ASICS)

(71) Applicant: Cisco Technology, Inc., San Jose, CA (US)

(72) Inventors: Sachin Agarwal, Fremont, CA (US); Aviran Kadosh, Moreshet, IL (US); Srirajkumar Sundararaman, San Jose, CA (US); Samir Valjibhai Rajgor, Santa Clara, CA (US); Chirag Shroff, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 228 days.

(21) Appl. No.: 18/539,147

(22) Filed: Dec. 13, 2023

(65) Prior Publication Data

US 2025/0200183 A1 Jun. 19, 2025

(51) Int. Cl.
*G06F 21/57* (2013.01)
*G06F 21/54* (2013.01)

(52) U.S. Cl.
CPC ............ *G06F 21/572* (2013.01); *G06F 21/54* (2013.01)

(58) Field of Classification Search
CPC ............................... G06F 21/572; G06F 21/54
See application file for complete search history.

(56) References Cited

U.S. PATENT DOCUMENTS

| | | | | |
|---|---|---|---|---|
| 9,141,747 | B1 * | 9/2015 | Orthner ................ | H03K 19/003 |
| 9,584,130 | B1 | 2/2017 | Weber et al. | |
| 2004/0143715 | A1 * | 7/2004 | Bonaccio ............ | G06F 15/7867 711/170 |
| 2014/0359755 | A1 | 12/2014 | Beitel et al. | |
| 2015/0074745 | A1 | 3/2015 | Stern et al. | |
| 2016/0239445 | A1 | 8/2016 | Davis et al. | |
| 2017/0177991 | A1 | 6/2017 | Bogue et al. | |

(Continued)

FOREIGN PATENT DOCUMENTS

JP 2008500635 A * 1/2008 ......... G06F 13/4013

OTHER PUBLICATIONS

Search Report and Written Opinion for International Application No. PCT/US2024/059172, Dated Feb. 13, 2025, 14 pages.

*Primary Examiner* — Hyun Soo Kim
(74) *Attorney, Agent, or Firm* — Lee & Hayes, P.C.

(57) ABSTRACT

This disclosure describes techniques for an isolated Root of Trust (RoT) component associated with a system-on-chip (SoC), such as a networking-related SoC, to enforce a persona on the SoC and/or control the operation of the SoC based on the enforced persona. In some cases, the RoT component is configured to: (i) determine a persona associated with the SoC based on firmware associated with the RoT component that defines a persona associated with the SoC, (ii) modifies one or more configurations associated with the SoC based on the defined persona, (iii) modifies the operation of the SoC based on determining that the SoC is operating in an operational environment that is different from the operational environment associated with the defined persona, and/or (iv) switches between two or more available personas associated with the SoC based on determining a change in an operational environment associated with the operation of the SoC.

18 Claims, 7 Drawing Sheets

(56) References Cited

U.S. PATENT DOCUMENTS

| | | | | |
|---|---|---|---|---|
| 2019/0121647 | A1* | 4/2019 | Por | G06F 9/4411 |
| 2019/0146943 | A1* | 5/2019 | Fender | G06F 30/34 710/105 |
| 2020/0183860 | A1* | 6/2020 | Chen | G06F 12/126 |
| 2021/0124711 | A1 | 4/2021 | Ansari et al. | |
| 2022/0327271 | A1 | 10/2022 | Weber et al. | |
| 2023/0318606 | A1* | 10/2023 | Jeon | G06F 13/4221 710/313 |
| 2024/0143758 | A1* | 5/2024 | Yim | G06F 9/4401 |

* cited by examiner

TECHNIQUES FOR ENFORCING CONFIGURATION REQUIREMENTS FOR APPLICATION-SPECIFIC INTEGRATED CIRCUITS (ASICS)

TECHNICAL FIELD

The present disclosure relates generally to chip-based security. Specifically, the present disclosure relates to systems and methods for using a root-of-trust for enforcing configuration requirements for an application-specific integrated circuit (ASIC).

BACKGROUND

An application-specific integrated circuit (ASIC) generally refers to an integrated circuit designed for a specific purpose. An ASIC may be efficient at performing the specific purpose for which it was designed compared to general-purpose circuits, like General Processing Units (GPUs) or Central Processing Units (CPUs), which can perform many different functions, but often less efficiently. A product may include a number of ASICs. As one example, a product could be a switch or a router that includes different ASICs to support different protocols. Other ASICs could be included for other purposes.

Various types of security risks threaten the integrity of the operation of an ASIC. In some cases, to prevent attacks, a private key is placed in a nonvolatile electrically erasable programmable read-only memory (EEPROM) (or battery-backed static random-access memory (SRAM)) and uses hardware cryptographic operations such as digital signatures or encryption. The nonvolatile memory is often vulnerable to invasive attack mechanisms. The protection against such attacks may require the use of active tamper detection/prevention circuitry which must be continually powered.

Different types of device tampering may occur and include attempts to unauthorizedly modify a device's capability from a lower-end product to a higher-end product, and or gain the unlawful possession of a device from a manufacturer to circumvent sales channels to sell or resell it to the customer at a lower price. Maintaining the authenticity of a device is vital for customer assurance and to ensure the reliability of the device itself. For example, a device may be used to support critical network functions such as in power grid applications requiring an expected guaranteed level of performance. The unauthenticated device can be susceptible to security intrusions that can degrade the device's performance and may result in network outages.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
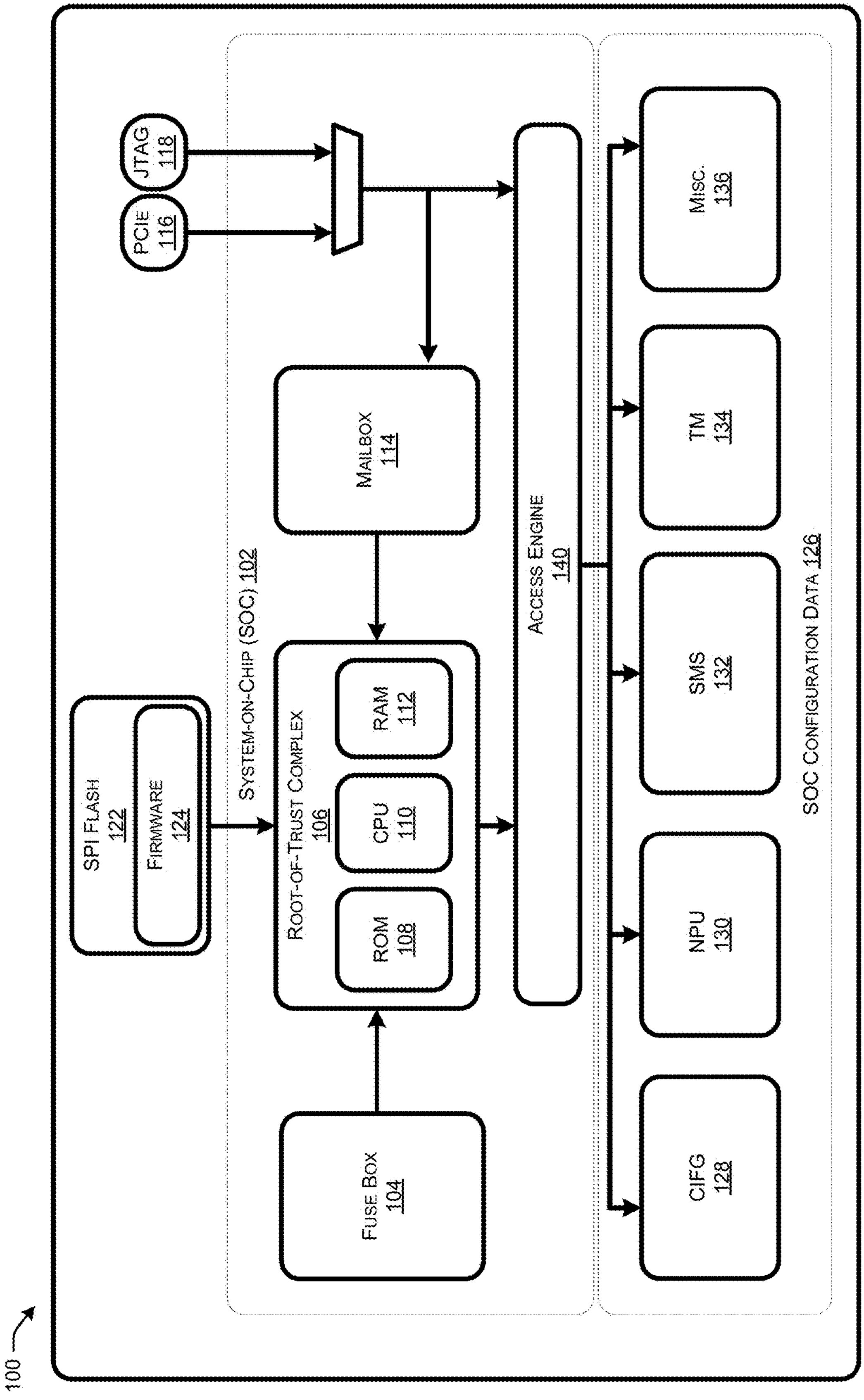
FIG. 1 provides a system architecture diagram of an example device with a system-on-chip (SoC) that includes a Root of Trust (RoT) central processing unit (CPU) complex.

This disclosure describes techniques for an isolated Root of Trust (RoT) component associated with a system-on-chip (SoC), such as a networking-related SoC, to enforce a persona on the SoC and/or control the operation of the SoC based on the enforced persona. A method to perform the techniques described herein may include receiving, by an isolated Root of Trust (RoT) code, an indication of a persona associated with the SoC, wherein the SoC is associated with a first configuration that assigns a first physical input/output port of the SoC to a first functionality associated with the SoC and a second physical input/output port of the SoC to a second functionality associated with the SoC. The method may further include, based on receiving the indication of the persona, modifying, by the isolated RoT code, configuration data associated with the SoC, wherein modifying the configuration data comprises replacing the first configuration with a second configuration that assigns the first physical input/output port of the SoC to the second functionality and the second physical input/output port to the first functionality. The method may further include, subsequent to modifying the configuration data, enabling the SoC to operate in accordance with the configuration data.

Additionally, the techniques described herein may be performed by a system and/or device having non-transitory computer-readable media storing computer-executable instructions that, when executed by one or more processors, performs the method described above.

Example Embodiments

This disclosure describes techniques for an isolated Root of Trust (RoT) component associated with a system-on-chip (SoC), such as a networking-related SoC, to enforce a persona on the SoC and/or control the operation of the SoC based on the enforced persona. In some cases, the RoT component is configured to: (i) determine a persona associated with the SoC based on firmware associated with the RoT component that defines a persona associated with the SoC, (ii) modifies one or more configurations associated with the SoC based on the defined persona, (iii) modifies the operation of the SoC based on determining that the SoC is operating in an operational environment that is different from the operational environment associated with the defined persona, and/or (iv) switches between two or more available personas associated with the SoC based on determining a change in an operational environment associated with the operation of the SoC.

In some cases, the techniques described herein enable the RoT component to determine a persona associated with the SoC based on firmware associated with the RoT component. The firmware, which may be stored on a flash memory, may include persona definition data. The persona definition data may include a static and/or hard-coded persona. Alternatively, the persona definition data may include a code that may be executed by the RoT component to dynamically determine the persona associated with the SoC. For example, the code may enable dynamically determining the SoC based on an operational environment associated with the operation of the SoC.

In some cases, the techniques described herein enable modifying one or more configurations associated with an SoC based on the defined persona associated with the SoC. In some cases, an SoC's persona defines at least one of the following configurations for an SoC: assignment of a set of pins (e.g., one or more physical input/output ports) associated with the SoC to a set of functional blocks associated with the SoC, assignment of a set of roles to a set of registers associated with the SoC, assignment of a set of functional blocks associated with the SoC to a set of registers associated with the SoC, assignment of a set of roles to a set of bit registers associated with the SoC, assignment of one or more byte ordering formats to one or more data records stored on memory addresses associated with the SoC, or assignment of a behavioral profile to the SoC that defines which functionalities are enabled and/or disabled on the SoC. In some cases, the RoT component retrieves the configurations required by a persona associated with the SoC (e.g., from firmware data associated with the RoT component) and modifies the configuration data associated with the SoC based on the retrieved configuration requirements. Modifying an SoC's configuration may include replacing configuration data associated with the SoC with new configuration data. Subsequent to modifying the configuration data, the RoT component may enable the SoC to operate in accordance with the new configuration data.

In some cases, the techniques described herein enable switching between two or more personas associated with an SoC based on (e.g., in response to) determining a change in the operational environment associated with the SoC. For example, in some cases, the RoT component may switch to a persona that has higher security requirements (e.g., requires enablement of one or more encryption capabilities) when it is detected that the SoC is operating in a less secure environment. As another example, in some cases, the RoT component may switch to a persona that provides higher bandwidth for QoS prioritization operations when it is detected that the SoC is operating in an environment in which higher level of QoS prioritization is recommended and/or required.

FIG. 1 provides a system architecture diagram of an example device 100 with a system-on-chip (SoC) 102 that includes a Root of Trust (RoT) central processing unit (CPU) complex 106. The RoT CPU complex 106 may be configured to operate in a zero-trust environment of the device 100. The RoT CPU complex 106 may be an isolated unit that is configured to establish a hardware-based root of trust (HWRoT) for the device 100. The HWRoT may provide a secured foundation for the device 100 by ensuring the integrity of critical firmware, applications, and/or data associated with the device 100. The RoT CPU complex 106 may provide cryptographic services and/or protected execution environments to support trusted boot, secured storage, and/or other security-critical functions needed in a zero-trust architecture. By leveraging hardware-enforced isolation and attestation capabilities, the RoT CPU complex 106 may enable the device 100 to operate securely even in the presence of compromise elsewhere in the system.

As depicted in FIG. 1, the SoC 102 includes a fuse box 104, an RoT CPU complex 106, a mailbox 114, a Peripheral Component Interconnect Express (PCI-e) interface 116, a Joint Test Action Group (JTAG) interface 118, and an access engine 140. In some cases, RoT CPU complex 106 is an isolated environment within the SoC 102 that operates in a zero-trust mode. The RoT CPU complex 106 may boot from immutable code stored in the secured Read-Only Memory (ROM) 108 and execute, using the secured Random Access Memory (112), secured firmware 124 stored on the serial peripheral interface (SPI) flash memory 122. The RoT CPU complex 106 may use cryptographic keys to authenticate external data like firmware and licensing codes before enabling SoC features.

As depicted in FIG. 1, the RoT CPU complex 106 includes a secured CPU (e.g., an ARC® processor) 110 that boots from code stored on the secured ROM 108 and executes secured firmware 124 retrieved from the SPI flash memory 122. In some embodiments, the secured firmware 124 is encrypted and stored on the SPI flash memory 122. In some embodiments, the SPI flash memory 122 may be used to store a firmware that is explicitly accessible by sending commands from instructions configured in the RoT code stored on the secured ROM 108. The RoT code may be input during the device manufacturing process and may include information from a digital identity certificate associated with the device 100 that enables the device 100. For example, the RoT code may include device enablement information that has been previously programmed into a hardware component during the manufacture of the device 100. In some cases, the SPI flash memory 122 stores firmware images and licensing codes used by the RoT CPU complex 106. At least some of the data stored by the SPI flash memory 122 may be encrypted and authenticated by the RoT CPU complex 106 before being executed or used to configure SoC features. In some cases, configuration data is passed to the device 100 via one or more digital identity certificates encoding one or more SKUs. In some cases, the firmware validates a certificate during each power-up and then extracts the encoded SKU to ascertain what configurations of the device 100.

In some cases, the secured CPU 110 includes specific cryptographic and computational hardware to facilitate the processing of cryptographic information associated with operation of the device 100. In some cases, the RoT CPU complex 106 configures the features of the device 100 (e.g., which may be a programmable device) with the RoT code stored in the secured ROM 108. In some cases, the secured CPU 110 executes instructions associated with the RoT code to access one or more built-in keys from secured storage of a fuse box 104 to create multiple type configurations for the device 100. Each type configuration may be identified by a different stock-keeping unit (SKU) that is decrypted by the built-in keys.

In some cases, the RoT code is configured to never be turned off as it operates in a zero-trust environment. For example, in some cases, the RoT CPU complex 106 operates independently of a host processor and/or an application processor to provide hardware-based security services. By isolating critical security functions in tamper-resistant hardware, the RoT CPU complex 106 may serve as a root of trust that protects the confidentiality, integrity, and/or authenticity of sensitive data and/or software associated with the device 100. In some cases, the host processor and/or the application processor may rely on the RoT CPU complex 106 to securely boot the system, store credentials and keys, and/or provide other cryptographic operations. For example, the RoT CPU complex 106 may use dedicated silicon fuses or memory to store device secrets and private keys that may be used for cryptographic functions like digital signatures. In some cases, RoT CPU complex 106 enables advanced security features like hardware-backed attestation. For example, in some cases, the RoT CPU complex 106 may be configured to generate signed measurements describing the hardware and/or software state associated with the RoT CPU complex 106.

In some cases, the device 100 is programmed to contain one or more electronic fuses (eFuses), such as one or more secured keys (e.g., built-in keys), contained in the fuse box 104 during manufacturing. The fuse box 104 may store cryptographic keys and device security settings in eFuses programmed during manufacturing. The eFuses may enable the RoT firmware to authenticate external data and licenses. The fuse box settings may also permanently enable or disable certain SoC features and functions.

The device 100 may configure the control of the Media Access Control Security (Mac Sec) for authentication and encryption of traffic over Ethernet on Layer 2 local area network (LAN) networks (e.g., using the SoC configuration engine 126). The manufacturing process associated with the device 100 may be configured to ensure that a secured boot mechanism starts the RoT by setting up one or more keys (e.g., a private-public key pair in the case of asymmetric encryption or a private key in the case of symmetric encryption) into the device 100 during the manufacturing process. In some embodiments, a CPU associated with the device 100 (e.g., the secured CPU 110) generates different authentication keys by generating random numbers using a true random number generator (TRNG) and storing the random numbers in the fuse box 104 with the assistance of firmware. In some embodiments, other than the built-in keys, the eFuses may be configured to store device security related to control and status bits.

In some cases, the mailbox 114 provides an interface for the RoT CPU complex 106 to securely communicate with other components. The mailbox 114 may enable the RoT CPU complex 106 to receive encrypted data like firmware and licensing codes from sources like the PCIe interface 116 and/or from the SPI flash memory 122. In some cases, the mailbox 114 contains instructions (e.g., encrypted instructions) associated with communication protocols and/or handshaking logic to allow the mailbox 114 to securely interface with the RoT CPU complex 106 and/or other components (e.g., the PCIe interface 116 and/or the JTAG interface 118). The mailbox 114 may also contain security control logic such as access control lists to ensure only authorized components may communicate via the mailbox 114 interface.

The PCIe interface 116 may enable an external device (e.g., an external host processor) to communicate with the SoC 102. For example, the PCIe interface 116 may receive, from the external device, requests for accessing (e.g., retrieving data from and/or modifying data stored in) one or more addresses (e.g., one or more registers) associated with the SoC configuration engine 126. Examples of such access requests include, in the context of a networking-related SoC, requests to read or write to registers controlling port enablement to turn on/off specific network ports, requests to access registers controlling MAC address filters for setting allowed MAC addresses, and requests to set registers controlling Quality of Service (QOS) parameters like bandwidth limits or queue priorities for different traffic flows. The PCIe interface 116 may enable external control over networking features by exposing key configuration registers to attached devices over the industry standard PCIe bus.

The JTAG interface 118 may enable an external device (e.g., an external host processor) to communicate with the SoC 102 to access and/or control on-chip debug modules and/or embedded instruments (e.g., trace buffers). For example, the JTAG interface 118 associated with a networking-related SoC may provide external visibility into internal packet processor state for debugging firmware, allow tracing packet flow through the SoC 102 to monitor performance, provide the ability to externally control to simulate anomalous scenarios by injecting anomalous packets, and/or the like. In some cases, the JTAG interface 118 grants external tools debug access to SoC 102 internals through a common 4 or 5 wire test access port without requiring vendor-specific connections.

The SoC configuration engine 126 stores configuration data (e.g., configuration registers) associated with the SoC 102. The SoC configuration engine 126 may include various configurable and status registers for different functional blocks, such as the Configuration Interface (CIFG) 128, the Network Processing Unit (NPU) 130, the Shared Memory System (SMS) 132, the Traffic Management (TM) component 134, and a component 136 that controls access to other types of configuration data such as registers for frequency monitoring, mapping of physical ports (e.g., physical pins) associated with the SoC 102 to functionalities (e.g., functional blocks) associated with the SoC 102, Inter-Integrated Circuit (I2C) bus configuration, and/or enabling or disabling JTAG functionality.

The access engine 140 controls access to internal SoC data and/or functionality, such as to the SoC configuration engine 126. In some cases, the access engine 140 validates any access requests using cryptographic signatures or identifiers to prevent unauthorized requests from modifying SoC configuration or operation. Once an access request is authenticated, the access engine 140 may determine if the requested access is allowed based on permissions, licenses, and any RoT constraints. The access engine 140 will deny the request if the external entity does not have proper rights.

In some cases, components of the SoC configuration engine 126 provide configurable settings and operational statuses for specific features of the SoC 102. For example, the CIFG 128 may store data controlling serialization/deserialization settings, port configurations, and/or bandwidth management. As another example, the NPU 130 may store data controlling MAC layer processing management and/or Access Control Lists (ACL) scaling. As another example, the SMS 132 may store data controlling buffer scaling within the device 100. As another example, the TM component 134 may store data controlling timing meters, counters, and queue scaling for traffic management.

As depicted in FIG. 1, the RoT CPU complex 106 may be configured to intercept all access requests received from external devices (e.g., a host processor) through one or more access interfaces (e.g., through the PCIe interface 116). For example, the mailbox 114 may be configured to provide all access requests to the RoT CPU complex 106. As another example, the mailbox 114 may be configured to generate an interrupt (e.g., a hardware interrupt) signal when the mailbox 114 receives an access request from an external device through an access interface. As another example, the RoT CPU complex 106 may be configured to execute operations that are configured to monitor access requests received by the mailbox 114.

The mailbox 114 may be an interconnect component that provides a secure interface for the RoT CPU complex 106 to communicate with one or more external devices. For example, the mailbox 114 may be configured to provide all access requests to the RoT CPU complex 106. The mailbox 114 may provide all access requests to the RoT CPU complex 106 for validation before allowing access to internal SoC data or functionality. For example, the RoT CPU complex 106 may authenticate access requests using cryptographic signatures or identifiers to prevent unauthorized requests from modifying SoC configuration or operation. After authenticating a request, the RoT CPU complex 106 may check whether the requested access is permitted based on permissions, licenses, and/or any root of trust constraints before allowing the request to proceed. By centralizing all external access through the mailbox 114 and RoT CPU complex 106, the SoC 102 may operate securely even when compromised components exist elsewhere in the system.

In some cases, the configuration data associated with the SoC 102 may associate different functionalities associated with the SoC 102 to different "pins" associated with the SoC 102. A pin may be a physical input/output port associated with the SoC 102. The SoC 102 may be associated with different functionalities provided by different functional blocks of the SoC 102. Examples of such functionalities include (e.g., in the context of an SoC associated with a networking functionality, such as a networking chip): (i) a functionality associated with a packet processing engine (e.g., including at least one of packet classification, forwarding, or routing), (ii) a functionality associated with a memory management unit (e.g., including at least one of buffering, storage, and/or retrieval of data packets), (iii) a functionality associated with an input/output interface (e.g., including at least one of managing physical connections to various network types or handling data transmission and reception), (iv) a functionality related to traffic management (e.g., including at least one of managing data flow, queue management, or congestion control), (v) a functionality related to security processing (e.g., including at least one of encryption, decryption, or managing authentication processes), (vi) a functionality related to control plane processing (e.g., including at least one of running network operating systems or performing network management tasks), (vii) a functionality related to switching fabric for efficient data transfer within the device, (viii) a functionality related to data buffering and caching to manage speed disparities in network communication, (ix) a functionality associated with a Quality of Service (QOS) engine for prioritizing network traffic, and (x) a functionality associated with an offload engine configured to improve performance by handling specific tasks such as checksum calculations.

In some cases, the configuration data associated with the SoC assigns each functionality associated with the SoC to one or more pins associated with the SoC. For example, the configuration data may assign the packet processing engine functionality to a first set of pins, the memory management unit functionality to a second set of pins, the input/output interface functionality to a third set of pins, and so on. Using the configuration data to map functionalities to pins may provide flexibility in how the SoC is used in different applications. For example, in one application that requires significant packet processing, more pins can be allocated for the packet processing engine. As another example, in another application requiring substantial data buffering, more pins can be allocated for the memory management unit. The configuration data may enable customization of the SoC pin assignments to optimize performance for different use cases.

In some cases, the RoT CPU complex 106 may be configured to update the configuration data associated with assignment of functionalities to pins. The RoT CPU complex 106 may be configured to make such updates based on the firmware 124 stored on the SPI flash memory 122. For example, the firmware 124 may include an indication of a static persona assigned to the SoC 102 and/or code configured to be executed to dynamically determine a persona for the SoC 102. The persona may in turn be associated with a particular assignment of functionalities associated with the SoC 102 to pins associated with the SoC 102. In some cases, a personality associated with the SoC 102 refers to a specific configuration of the SoC 102 that enables a particular set of capabilities or behaviors suited for a target application or environment. For example, one persona may be configured to optimize the SoC for network switching capabilities by assigning more pins and internal resources to packet processing engines and/or input/output interfaces. As another example, another persona may be configured to optimize for storage by allocating more pins for memory management and/or data buffering. In some cases, the persona associated with an SoC is determined based on an expected operational environment (e.g., an expected geographic environment, an expected use case, an expected network environment, and/or the like) associated with the operation of the SoC.

In some cases, to update assignment of pins to SoC functionalities, the RoT CPU complex 106 may first read the current persona configuration from firmware 124, which specifies the desired SoC functionality profile and pin mapping. The RoT CPU complex may then reconfigure the pin multiplexer settings to connect internal SoC functional blocks to the updated physical pins as dictated by the new persona. The RoT CPU complex may also modify the internal SoC interconnect fabric routing to map signals from functional blocks to the newly assigned pins accordingly. In some cases, as part of assigning a pin to a functional block, the RoT CPU complex updates the configuration data associated with the functional block to send and/or receive data using the assigned pin. Accordingly, in some cases, the RoT CPU complex 106 may enforce an assigned policy on an SoC based at least in part on the assignment of the SoC's pins to functional blocks associated with the pins.

In some cases, configuration data associated with the SoC 102 may assign different registers associated with the SoC 102 to different roles. For example, the configuration data may determine whether a register is a control register or a status register. A status register may be used to store information about the state of the SoC, for example using flags and/or indicators that provide details about the outcome of various operations or the current state of the system. A control register may be used to control operations of the SoC or another hardware component, for example by defining settings for enabling and/or disabling certain features, selecting modes of operation, controlling hardware interfaces, setting interrupt masks, and/or the like. In some cases, the configuration data may define the use case of one or more registers. For example, the configuration data may define that a first register is used for holding data temporarily for arithmetic operations, such as an accumulator in a processor, where it stores the results of arithmetic and logic operations. As another example, the configuration data may define that a second register is used as an instruction pointer or program counter, which holds the address of the next instruction to be executed. As another example, the configuration data may define that a third register is used as a stack pointer by managing the call stack during program execution and pointing to the top of the stack in memory. As another example, the configuration data may define that a first register is used for enabling a packet processing engine, a second register is used for selecting the active network interface, a third register is used for controlling direct memory access (DMA) transfer settings, and a fourth register is used for storing buffer utilization statistics.

In some cases, the RoT CPU complex 106 may be configured to update the configuration data associated with assignment of roles to the registers associated with the SoC. The RoT CPU complex 106 may be configured to make such updates based on the firmware 124 stored on the SPI flash memory 122. For example, the firmware 124 may include an indication of a static persona assigned to the SoC 102 and/or code configured to be executed to dynamically determine a persona for the SoC 102. The static persona and/or the dynamically determine a persona may then be associated with a mapping of a set of roles to a set of SoC registers. In some cases, to update the role of an SoC register, the RoT CPU complex 106 may first reference a register role mapping table defined in firmware for the target persona. The RoT CPU complex 106 may then temporarily disable access to the register being reassigned to prevent unintended writes. Next, the RoT CPU complex may reconfigure the register interface logic to match the updated role, for example by modifying access permissions, data routing, and/or interface signals as required. The RoT CPU complex 106 may also adjust any functional blocks related to the role being assigned to interact with the register's new role. Once reconfigured, the RoT CPU complex may run test accesses to validate the register's operation in its new role. The RoT CPU complex 106 may then re-enable full access to the register in its new mode.

In some cases, configuration data associated with the SoC 102 may assign different functionalities and/or functional blocks associated with the SoC 102. For example, the configuration data may assign specific a first set of control and/or status registers to a packet processing engine, a second set of control and/or status registers to a memory management unit, a third set of control and/or status registers to an input/output interface, and/or the like. In some cases, the specific assignment of functional blocks associated with an SoC to registers associated with the SoC may define an aspect of the operational capabilities of the SoC. For example, not allocating required control and/or access registers to a functional block may disable the operation of the functional block and/or reduce a performance metric (e.g., speed, security, reliability, and/or the like) associated with the operation of the functional block. As another example, allocating a fewer number of control registers and/or status registers to a functional block may reduce a performance metric (e.g., speed, security, reliability, and/or the like) associated with the operation of the functional block. In some cases, allocating a register (e.g., a control and/or access register) having a higher access latency (e.g., a higher retrieval latency and/or a higher update latency) to a functional block may reduce a performance metric (e.g., speed, security, reliability, and/or the like) associated with the operation of the functional block. For example, the configuration data may deprioritize a functional block by assigning registers stored on lower-speed memory and/or registers outside of the CPU to the functional block.

In some cases, the RoT CPU complex 106 may be configured to update the configuration data associated with assignment of registers to functional blocks. The RoT CPU complex 106 may be configured to make such updates based on the firmware 124 stored on the SPI flash memory 122. For example, the firmware 124 may include an indication of a static persona assigned to the SoC 102 and/or code configured to be executed to dynamically determine a persona for the SoC 102. The static persona and/or the dynamically determine a persona may then be associated with a mapping of a set of functional blocks to a set of SoC registers. In some cases, to update the functional block assigned to an SoC register, the RoT CPU complex 106 may first reference a register-block mapping table defined in firmware for the target persona. The RoT CPU complex 106 may then temporarily disable access to the register being reassigned to prevent unintended writes. Next, the RoT CPU complex may reconfigure the register interface logic to match the assigned role associated with the assigned functional block, for example by modifying access permissions, data routing, and/or interface signals as required. The RoT CPU complex 106 may also adjust any configuration data associated with the assigned functional block to interact with the register. Once reconfigured, the RoT CPU complex may run test accesses to validate the register's operation in relation to the assigned functional block. The RoT CPU complex 106 may then re-enable full access to the register in its new mode.

In some cases, the configuration data associated with the SoC 102 may indicate which bit (e.g., and/or other register segment) of a register is assigned to which role. For example, in a control register, the configuration data may assign bit 0 to enabling or disabling the packet processing engine, bit 1 to selecting the active network interface, bit 2 to controlling DMA transfer settings, and so on. As another example, in a status register, the configuration data may assign bit 0 to indicate whether the packet processing engine is idle or busy, bit 1 to indicating whether the memory buffer is full or empty, bit 2 to a parity error flag, and so on. As another example, in a control register (e.g., a 32-bit control register), specific bits may be dedicated to enabling or disabling certain features, while others could be dedicated to status flags or specific control signals. Such role definitions for bits may be defined by the configuration data associated with the SoC 102.

In some cases, the RoT CPU complex 106 may be configured to update the configuration data associated with assignment of roles to register bits. The RoT CPU complex 106 may be configured to make such updates based on the firmware 124 stored on the SPI flash memory 122. For example, the firmware 124 may include an indication of a static persona assigned to the SoC 102 and/or code configured to be executed to dynamically determine a persona for the SoC 102. The static persona and/or the dynamically determine a persona may then be associated with a mapping of a set of functional blocks to a set of SoC registers. In some cases, to update the configuration data associated with assignment of roles to register bits, the RoT CPU complex 106 may first retrieve the register bit layouts associated with the persona definition. The RoT CPU complex 106 may then temporarily disable access to the register whose bit is being reassigned to prevent unintended writes. The RoT CPU complex 106 may then reconfigure the register access logic and/or any associated functional blocks to interact with the bits in their newly assigned roles. This may involve adjusting shift and/or mask settings associated with the bit, adjusting routing signals associated with the bit, and/or modifying data processing routines executed by the SoC 102 to match the updated bit assignments. Once reconfigured, the RoT CPU complex may run test accesses to validate correct operation after reconfiguring the role assigned to the register bit. The RoT CPU complex 106 may then re-enable full access to the register in its new mode.

In some cases, the configuration data associated with the SoC 102 may indicate the byte ordering(s) used to store data in memory addresses associated with the SoC 102. For example, the configuration data associated with the SoC 102 in some cases represents whether a big-endian or little-endian format is used to store data on a set of memory addresses. The big-endian format may store the most significant byte of data in the smallest memory address in a sequence of memory addresses assigned to the data, while the little-endian format may store the least significant byte of the data in the smallest memory address in the sequence of memory addresses assigned to the data. In some cases, the configuration data associated with the SoC 102 may store a first data record stored on the SoC 102 using the big-endian format and a second data record stored on the SoC 102 using the little-endian format. As another example, the configuration data associated with the SoC 102 may store all data stored on the SoC using the big-endian format. As another example, the configuration data associated with the SoC 102 may store all data stored on the SoC using the little-endian format.

In some cases, the RoT CPU complex 106 may be configured to update the configuration data associated with assignment of byte orderings to data records. The RoT CPU complex 106 may be configured to make such updates based on the firmware 124 stored on the SPI flash memory 122. For example, the firmware 124 may include an indication of a static persona assigned to the SoC 102 and/or code configured to be executed to dynamically determine a persona for the SoC 102. The static persona and/or the dynamically determine a persona may then be associated with a mapping of a set of bytes ordering formats to a set of SoC data records. In some cases, to update the configuration data associated with assignment of byte orderings to data records, the RoT CPU complex 106 may first retrieve the address ordering format(s) associated with the persona definition. The RoT CPU complex may then reconfigure the memory interface and/or any functional blocks that generate and/or process addresses to use the newly specified ordering. This may involve modifying address ordering in memory access logic.

In some cases, the configuration data associated with the SoC 102 may indicate which functions associated with the SoC 102 should be enabled and/or disabled. For example, the configuration may enable and/or disable encryption functions, enable and/or disable QoS prioritization functions, enable and/or disable traffic shaping functions, enable and/or disable load balancing functions, enable and/or disable intrusion detection functions, and/or the like. In some cases, the set of functions assigned to an SoC depend on the type of the SoC, the type of an SoC user's subscription, and/or the operational environment within which the SoC operates. For example, in some cases, encryption functions may only be available for higher-tier users and/or higher-tier SoCs. In some cases, by defining the functions associated with an SoC using the configuration data that may be overwritten by the RoT CPU complex, the techniques described herein enable on-demand and/or programmable modification of the functions enabled on an SoC.

In some cases, the RoT CPU complex 106 may be configured to update the configuration data associated with assignment of byte orderings to data records. The RoT CPU complex 106 may be configured to make such updates based on the firmware 124 stored on the SPI flash memory 122. For example, the firmware 124 may include an indication of a static persona assigned to the SoC 102 and/or code configured to be executed to dynamically determine a persona for the SoC 102. The static persona and/or the dynamically determine a persona may then be associated with a mapping of a set of functions assigned to the SoC 102. In some cases, to update the configuration data associated with assignment of functions to the SoC 102, the RoT CPU complex 106 may first retrieve the assigned function(s) associated with the persona definition. The RoT CPU complex may then use the fuse box 104 to execute operations associated with eFuses that are configured to enable and/or disable particular SoC functions. The RoT CPU complex may also power down any hardware modules associated with newly disabled functions.

In some cases, the configuration data associated with the SoC 102 may indicate how an interconnect component, such as a crossbar switch, connects the internal components of the SoC 102. The interconnect settings may determine which modules can communicate directly with each other. Examples of interconnect component settings include settings associated with enabling and/or disabling direct transmission paths between specific components, settings associated with prioritizing certain inter-component communication paths over others by assigning bandwidth to the prioritized paths, settings associated with configuring routing tables and/or lookup tables that control how packets are forwarded between components, settings associated with defining communication protocols and/or encoding formats for inter-components data transfers, settings associated with establishing security policies such as encryption requirements for selected data paths, and/or the like.

In some cases, the RoT CPU complex 106 may be configured to update the configuration data associated with interconnect component settings associated with the interconnect component of the SoC 102. The RoT CPU complex 106 may be configured to make such updates based on the firmware 124 stored on the SPI flash memory 122. For example, the firmware 124 may include an indication of a static persona assigned to the SoC 102 and/or code configured to be executed to dynamically determine a persona for the SoC 102. The static persona and/or the dynamically determine a persona may then be associated with a set of interconnect component settings. In some cases, to update the configuration data associated with interconnect component settings, the RoT CPU complex 106 may first retrieve the interconnect component settings associated with the persona definition. The RoT CPU complex may then reconfigure the interconnect component logic (e.g., the crossbar switch logic) according to the interconnect component settings specified by the persona definition.

Accordingly, as described above, the configuration data associated with the SoC 102 may be updated based on a persona defined by the firmware 124 stored on the SPI flash memory 122, where the persona requirements may be retrieved and enforced by the RoT CPU complex 106. The persona definition data stored by the firmware 124 may include a definition of a static persona for the SoC 102. Alternatively, the persona definition data stored by the firmware 124 may include a code configured to be executed by the RoT CPU complex 106 to determine a persona associated with the SoC 102 based on one or more operational properties associated with the operation of the SoC 102.

For example, the RoT CPU complex 106 may be configured to determine the persona associated with the SoC 102 based on a detected operational environment (e.g., an expected geographic region environment, an expected use case, an expected network environment, and/or the like) associated with the operation of the SoC. For example, in some cases, the RoT CPU complex 106 may switch to a persona that has higher security requirements (e.g., requires enablement of one or more encryption capabilities) when it is detected that the SoC 102 is operating in a less secure environment. As another example, in some cases, the RoT CPU complex 106 may switch to a persona that provides higher bandwidth for QoS prioritization operations when it is detected that the SoC 102 is operating in an environment in which higher level of QoS prioritization is recommended and/or required.

In some cases, the operational environment of the SoC 102 is provided to the RoT CPU complex 106 by an external component outside of the SoC 102. In some cases, the operational environment of the SoC 102 is hard-coded into the firmware 124. In some cases, the operational environment of the SoC 102 is determined by the SoC based on operational data associated with the operation of the SoC 102. In some cases, the RoT CPU complex 106 is configured to detect an operational environment within which the SoC 102 operates based on access requests received by the SoC 102 and/or intercepted by the RoT CPU complex 106. For example, in some cases, different operational environments may be associated with different patterns of accessing different addresses. Some addresses may only be known to external devices associated with particular operational environments. Accordingly, in some cases: (i) frequent access to such exclusively known addresses may indicate operation of the SoC 102 within the particular operational environments, and/or (ii) infrequent and/or lack of access to such exclusively known addresses may indicate operation of the SoC 102 outside the particular operational environments. In some cases, the RoT CPU complex 106 may be configured to determine access rates for one or more addresses and use the access rates to determine an operational environment within which the SoC 102 operates. For example, the RoT CPU complex 106 may determine (e.g., based on data stored as part of the firmware 124 stored on the SPI flash memory 122) that devices associated with a particular company execute code associated with software development kits (SDKs) that frequently access a set of reserved configuration registers associated with the SoC configuration engine 126. Based on this determination, the RoT CPU complex 106 may determine: (i) that the SoC 102 is operating outside the operational environment associated with the company if the access rates for the set of reserved configuration registers falls below a threshold (e.g., if the set of reserved configuration registers are not accessed within a defined past period), and/or (ii) that the SoC 102 is operating inside the operational environment associated with the company if the access rates for the set of reserved configuration registers exceed or equal a threshold (e.g., if the set of reserved configuration registers are accessed within a defined past period). In some cases, the RoT CPU complex 106 determines an operational environment associated with the operation of the SoC 102 by at least in part detecting a geographic location within which the SoC 102 operates, for example based on an Internet Protocol (IP) address associated with a system that includes the SoC 102 and/or based on the patterns of IP addresses processed by and/or provided to the SoC 102.

In some cases, the RoT CPU complex 106 is configured to: (i) identify a persona (e.g., a static persona) associated with the SoC 102, (ii) determine an operational environment associated with the identified persona, (iii) determine (e.g., based on an externally provided indication and/or based on monitoring operation of the SoC 102) that the SoC 102 is operating outside of the operational environment associated with the identified persona, and (iv) modify the operation of the SoC 102 (e.g., by disabling the operation of the SoC 102 entirely, by enabling one or more functionalities of the SoC 102, by disabling one or more functionalities of the SoC 102, and/or the like) based on determining that the SoC 102 is operating outside of the operational environment associated with the identified persona. For example, the RoT CPU complex 106 may determine that: (i) the SoC 102 is associated with a persona adapted for a more isolated operational environment that requires less encryption capabilities, and (ii) the SoC is being operated outside of the more isolated operational environment. Based on these determinations, the RoT CPU complex may modify the operation of the SoC 102 by disabling the operation of the SoC 102 entirely, by enabling one or more functionalities of the SoC 102, by disabling one or more functionalities of the SoC 102, and/or the like.

As described above, the RoT CPU complex 106 may be configured to disable operation of the SoC 102, enable one or more functionalities of the SoC 102, and/or disable one or more functionalities of the SoC 102 based on comparing the operational environment within which the SoC 102 is detected to operate and the operational environment within which the SoC 102 is expected to operate based on the persona assigned to the SoC 102. For example, in some cases, if the SoC 102 is reserved for operation within a set of authorized environments, the RoT CPU complex 106 may disable the operation of the SoC 102 if the RoT CPU complex 106 detects that the SoC is operating outside the authorized set of environments. As another example, in some cases, if a set of functionalities of the SoC 102 are reserved for a set of authorized environments, the RoT CPU complex 106 may disable the set of functionalities if the RoT CPU complex 106 detects that the SoC is operating outside the authorized set of environments. As another example, in some cases, if a set of functionalities of the SoC 102 are reserved for a set of authorized environments, the RoT CPU complex 106 may ensure that the set of functionalities are enabled if the RoT CPU complex 106 detects that the SoC is operating inside the authorized set of environments.

Accordingly, in some cases, the RoT CPU complex 106 may act as a safeguard against unauthorized uses of the SoC 102. For example, the RoT CPU complex 106 may disable the SoC or limit its capabilities when it detects the SoC is moved outside of expected environments. This may be configured to prevent use of the SoC in unauthorized ways not aligned with the intended persona configuration.

Figure 2:
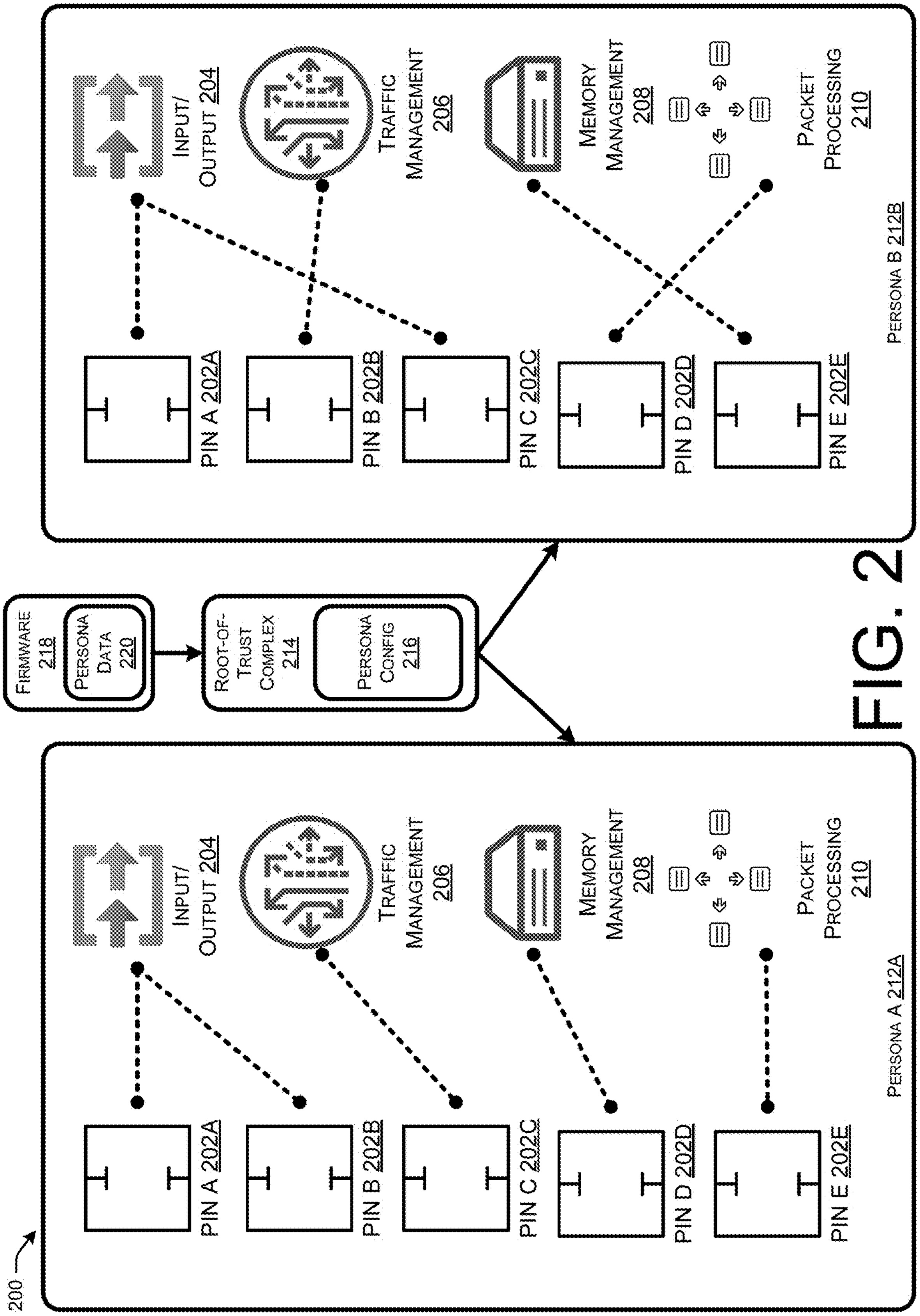
FIG. 2 provides an operational example of two personas defined based on pin-to-block assignments that may be enforced by an RoT CPU complex on an SoC.

FIG. 2 provides an operational example 200 of two personas defined based on pin-to-block assignments that may be enforced by an RoT CPU complex 214 on an SoC. The two personas may be defined by persona definition data 220 stored on firmware 218 associated with the SoC. The firmware 218 may, for example, be stored on an SPI flash memory associated with the SoC.

As depicted in FIG. 2, the RoT CPU complex 214 may be configured to enforce (e.g., using the persona configuration engine 216) at least one of the persona A 212A or the persona B 212B on the SoC. For example, one of the persona A 212A or the persona B 212B may be designated as the assigned persona for the SoC by the firmware 218. As another example, the persona configuration engine 216 may be configured to execute code configure to: (i) select one of the persona A 212A or the persona B 212B for enforcement on the SoC (e.g., based on a detected operational environment associated with the SoC), and (ii) perform operations to modify the configuration data associated with the SoC to enforce the configuration settings associated with the selected persona.

As further depicted in FIG. 2, the persona A 212A is associated with a first arrangement for assignment of functional blocks associated with the SoC to pins associated with the SoC. In accordance with the first arrangement, the input/output component 204 is assigned a pin A 202A and a pin B 202B, the traffic management component 206 is assigned a pin C 202C, the memory management component 208 is assigned a pin D 202D, and the packet processing component 210 is assigned a pin E 202E. In some cases, in accordance with the first arrangement, the input/output component 204 may receive data and/or send data using one or more of the pin A 202A or the pin B 202B, the traffic management component 206 may receive data and/or send data using the pin C 202C, the memory management component 208 may receive data and/or send data using pin the D 202D, and the packet processing component 210 may receive data and/or send data using pin the E 202E.

As further depicted in FIG. 2, the persona B 212B is associated with a second arrangement for assignment of functional blocks associated with the SoC to pins associated with the SoC. In accordance with the second arrangement, the input/output component 204 is assigned the pin A 202A and the pin C 202C, the traffic management component 206 is assigned the pin B 202B, the memory management component 208 is assigned the pin E 202E, and the packet processing component 210 is assigned the pin D 202D. In some cases, in accordance with the second arrangement, the input/output component 204 may receive data and/or send data using one or more of the pin A 202A or the pin C 202C, the traffic management component 206 may receive data and/or send data using the pin B 202B, the memory management component 208 may receive data and/or send data using the pin E 202*e*, and the packet processing component 210 may receive data and/or send data using the pin D 202D.

Figure 3:
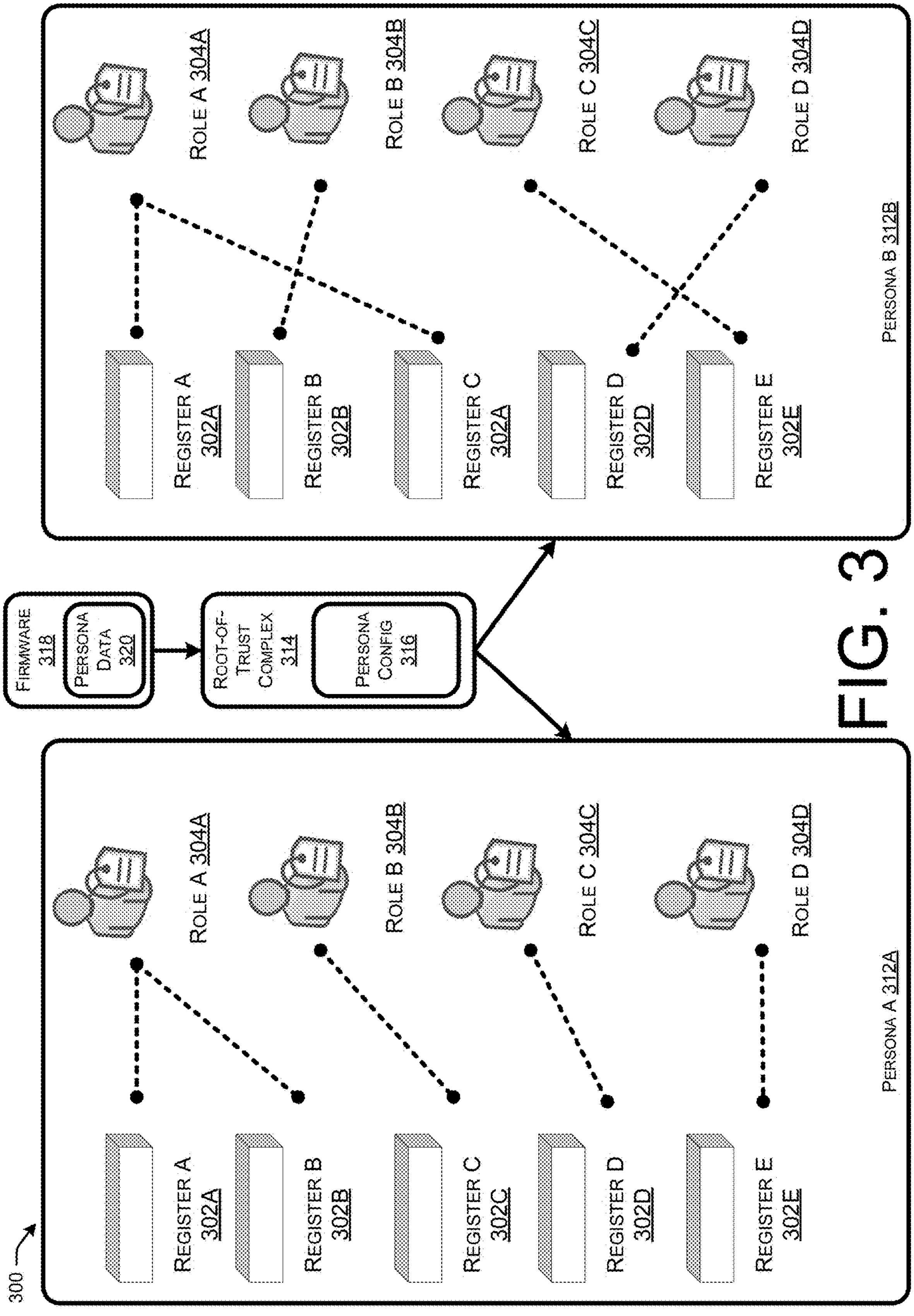
FIG. 3 provides an operational example of two personas defined based on register role assignments that may be enforced by an RoT CPU complex on an SoC.

FIG. 3 provides an operational example 300 of two personas defined based on register role assignments that may be enforced by an RoT CPU complex 314 on an SoC. The two personas may be defined by persona definition data 320 stored on firmware 318 associated with the SoC. The firmware 318 may, for example, be stored on an SPI flash memory associated with the SoC.

As depicted in FIG. 3, the RoT CPU complex 314 may be configured to enforce (e.g., using the persona configuration engine 316) at least one of the persona A 312A or the persona B 312B on the SoC. For example, one of the persona A 312A or the persona B 312B may be designated as the assigned persona for the SoC by the firmware 318. As another example, the persona configuration engine 316 may be configured to execute code configure to: (i) select one of the persona A 312A or the persona B 312B for enforcement on the SoC (e.g., based on a detected operational environment associated with the SoC), and (ii) perform operations to modify the configuration data associated with the SoC to enforce the configuration settings associated with the selected persona.

As further depicted in FIG. 3, the persona A 312A is associated with a first arrangement for assignment of functional blocks associated with the SoC to registers associated with the SoC. In accordance with the first arrangement, the role A 304A is assigned to a register A 302A and a register B 302B, the role B 304B is assigned to a register C 302C, the role C 304C is assigned to a register D 302D, and the role D 304D is assigned to a register E 302E. In some cases, in accordance with the first arrangement, the role A 304A may be performed by one or more of the register A 302A or the register B 302B, the role B 304B may be performed by the register C 302C, the role C 304C may be performed by register the D 302D, and the role D 304D may be performed by register the E 302E.

As further depicted in FIG. 3, the persona B 312B is associated with a second arrangement for assignment of functional blocks associated with the SoC to registers associated with the SoC. In accordance with the second arrangement, the role A 304A is assigned to the register A 302A and the register C 302C, the role B 304B is assigned to the register B 302B, the role C 304C is assigned to the register E 302E, and the role D 304D is assigned to the register D 302D. In some cases, in accordance with the second arrangement, the role A 304A may be performed by one or more of the register A 302A or the register C 302C, the role B 304B may be performed by the register B 302B, the role C 304C may be performed by the register E 302*e*, and the role D 304D may be performed by the register D 302D.

Figure 4:
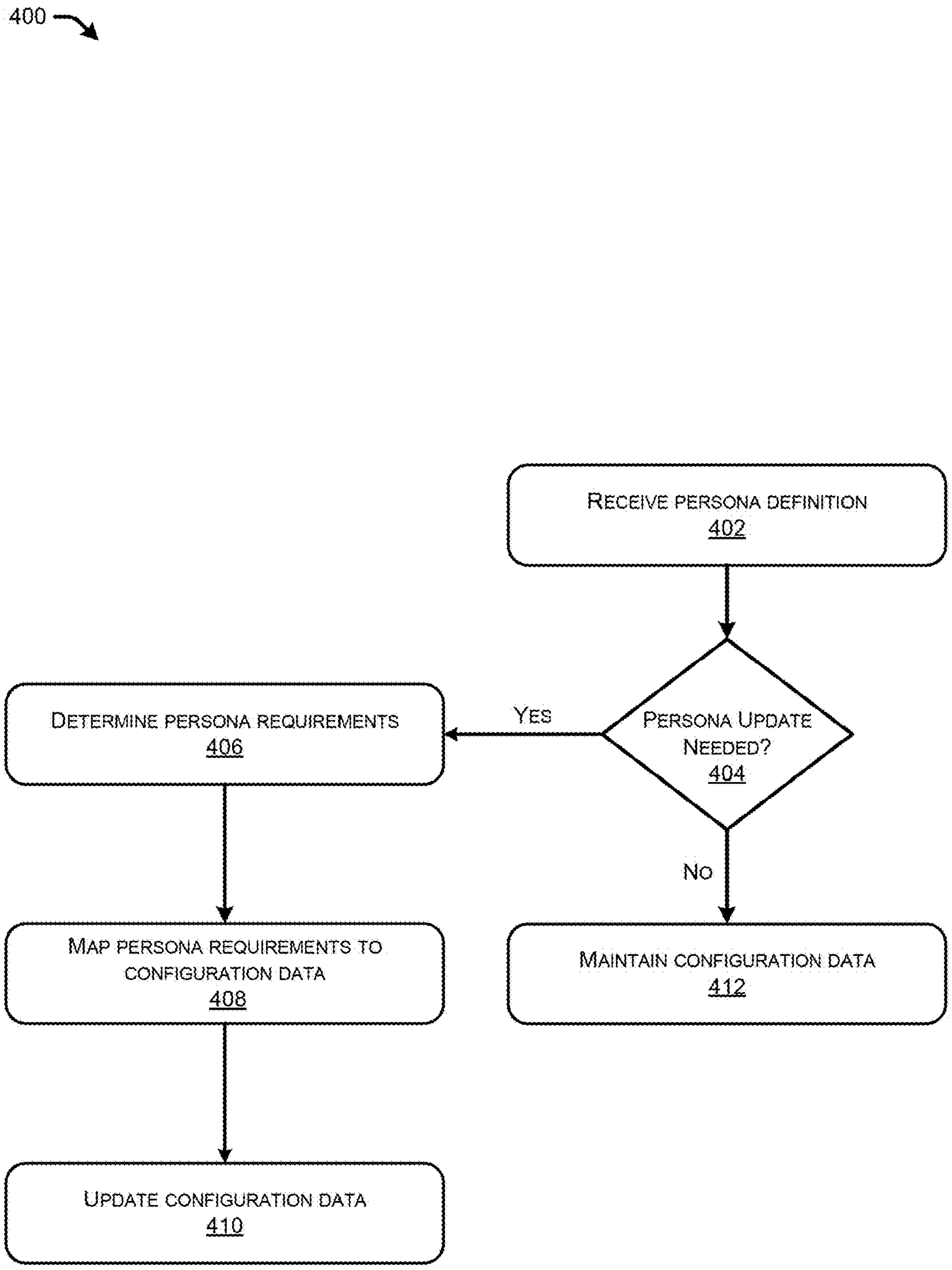
FIG. 4 is a flowchart diagram of an example process for configuring the operation of an SoC based on a persona defined for the SoC.

FIG. 4 is a flowchart diagram of an example process 400 for configuring the operation of an SoC based on a persona defined for the SoC. As depicted in FIG. 4, at operation 402, an example system (e.g., an RoT CPU complex) receives a definition of the persona. The persona may be associated with a designator and/or one or more configuration settings. In some cases, the system retrieves the configurations required by a persona associated with the SoC (e.g., from firmware data associated with the RoT component) and modifies the configuration data associated with the SoC based on the retrieved configuration requirements.

At operation 404, the system determines whether a change in the persona associated with the SoC is needed. In some cases, the system determines whether the persona received at operation 402 is currently enforced on the SoC. If the system determines that the received persona is currently enforced on the SoC, the system may determine that a change in the SoC's persona is not needed. If the system determines that the received persona is currently not enforced on the SoC, the system may determine that a change in the SoC's persona is needed.

If the system determines that there is no need for changing the SoC's persona (operation 404—No), then the system proceeds to operation 412 to maintain the existing configurations associated with the SoC. However, if the system determines that there is a need for changing the SoC's persona (operation 404—Yes), the system proceeds to operation 406 to determine one or more configuration requirements associated with the map the persona to one or more configuration settings associated with the Soc. The configuration requirements may describe one or more requirements associated with a desirable operation of the SoC as determined based on the received persona.

At operation 408, the system maps the configuration settings associated with the SoC's persona to one or more configuration modification actions. In some cases, an SoC's persona defines at least one of the following configuration modifications for an SoC: assignment of a set of pins (e.g., one or more physical input/output ports) associated with the SoC to a set of functional blocks associated with the SoC, assignment of a set of roles to a set of registers associated with the SoC, assignment of a set of functional blocks associated with the SoC to a set of registers associated with the SoC, assignment of a set of roles to a set of bit registers associated with the SoC, assignment of one or more byte ordering formats to one or more data records stored on memory addresses associated with the SoC, or assignment of a behavioral profile to the SoC that defines which functionalities are enabled and/or disabled on the SoC.

At operation 410, the system updates configuration data associated with the SoC based on the required configuration data modifications. For example, the system may modify, based on the configuration data modifications determined at operation 410, at least one of assignment of a set of pins (e.g., one or more physical input/output ports) associated with the SoC to a set of functional blocks associated with the SoC, assignment of a set of roles to a set of registers associated with the SoC, assignment of a set of functional blocks associated with the SoC to a set of registers associated with the SoC, assignment of a set of roles to a set of bit registers associated with the SoC, assignment of one or more byte ordering formats to one or more data records stored on memory addresses associated with the SoC, or assignment of a behavioral profile to the SoC that defines which functionalities are enabled and/or disabled on the SoC.

Figure 5:
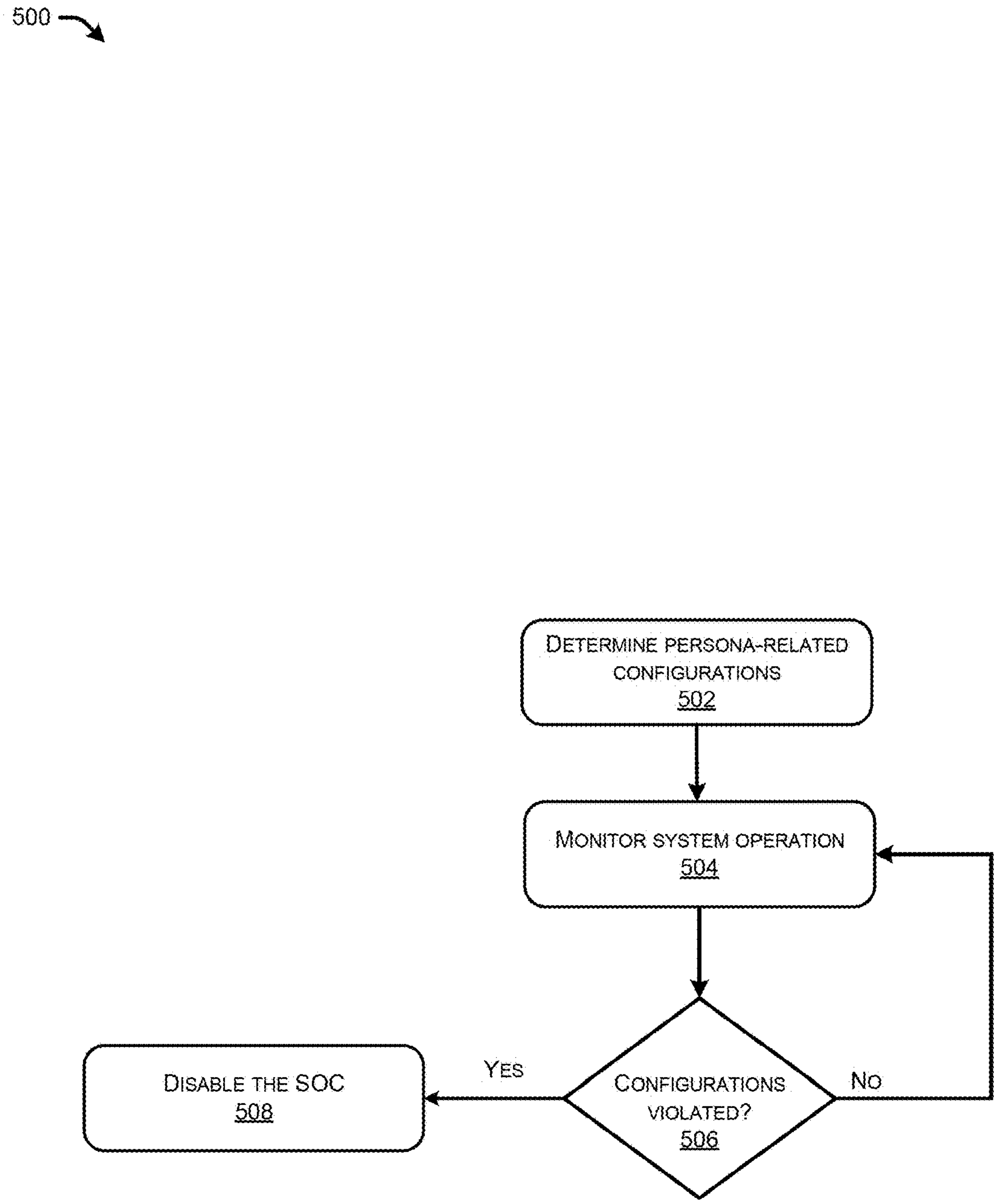
FIG. 5 is a flowchart diagram of an example process for conditionally disabling access to an SoC based on whether the SoC is used in violation of the SoC's policy.

FIG. 5 is a flowchart diagram of an example process 500 for conditionally disabling access to an SoC based on whether the SoC is used in violation of the SoC's policy. As depicted in FIG. 5, at operation 502, an example system (e.g., an RoT CPU complex) determines one or more configuration requirements associated with the SoC's persona. The configuration requirements may relate to at least one of assignment of a set of pins (e.g., one or more physical input/output ports) associated with the SoC to a set of functional blocks associated with the SoC, assignment of a set of roles to a set of registers associated with the SoC, assignment of a set of functional blocks associated with the SoC to a set of registers associated with the SoC, assignment of a set of roles to a set of bit registers associated with the SoC, assignment of one or more byte ordering formats to one or more data records stored on memory addresses associated with the SoC, or assignment of a behavioral profile to the SoC that defines which functionalities are enabled and/or disabled on the SoC.

At operation 504, the system monitors the SoC operations. Monitoring SoC operations may include, for example, monitoring register retrievals and/or register retrieval attempts by functional blocks associated with the SoC, monitoring pin usages and/or pin usage attempts by functional blocks associated with the SoC, monitoring usages and/or attempts to use functionalities enabled and/or disabled by the SoC's persona, and/or the like.

At operation 506, the system determines whether the monitored SoC operations indicate a violation and/or an attempt to violate the SoC's policy. For example, the system may determine whether a functional block is using and/or attempting to use an unassigned pin. As another example, the system may determine whether a functionality disabled by the SoC's persona is used and/or requested to be used. As another example, the system may determine whether a functional block is using and/or attempting to use an unassigned register and/or an unassigned register bit.

If the system determines that the monitored SoC operations indicate a violation and/or an attempt to violate the SoC's policy (operation 506—Yes), the system may proceed to operation 508 to disable the operation of the SoC. This disablement may be a security measure taken against unauthorized and/or unsecure use of the SoC. the monitored SoC operations do not a violation and/or an attempt to violate the SoC's policy (operation 506—No), the system may return to operation 504 to continue monitoring the SoC's operation.

Figure 6:
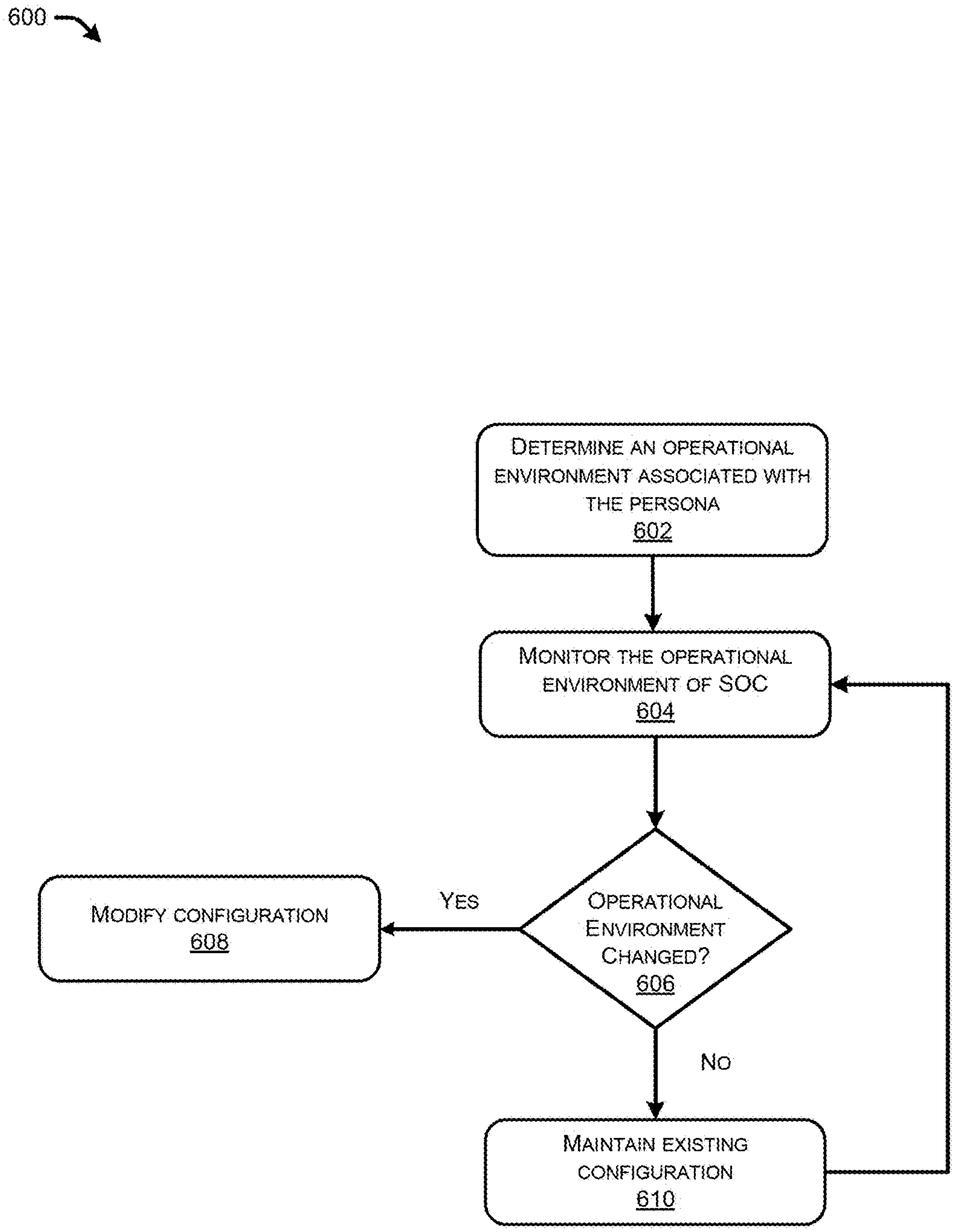
FIG. 6 is a flowchart diagram of an example process for modifying one or more configurations associated with an SoC based on the SoC's persona and an observed operational state associated with the SoC.

FIG. 6 is a flowchart diagram of an example process 600 for modifying one or more configurations associated with an SoC based on the SoC's persona and an observed operational state associated with the SoC. As depicted in FIG. 6, at operation 602, an example system (e.g., an RoT CPU complex) determines an expected operational environment associated with the SoC. The expected operational environment may be the operational environment associated with the SoC's assigned persona. For example, based on the SoC's persona, the system may determine that the SoC is authorized to operate only in a high-security environment.

At operation 604, the system monitors the operations associated with the SoC to determine the operational environment associated with the monitored operation of the SoC. In some cases, the operational environment of the SoC is provided to the system by an external component outside of the SoC. In some cases, the operational environment of the SoC is hard-coded into the firmware associated with the system. In some cases, the operational environment of the SoC is determined by the SoC based on operational data associated with the operation of the SoC. In some cases, the system is configured to detect an operational environment within which the SoC operates based on access requests received by the SoC and/or intercepted by the system. For example, in some cases, different operational environments may be associated with different patterns of accessing different addresses.

At operation 606, the system determines whether the expected operational environment and the observed operational environment are compatible. If the system determines that the expected operational environment and the observed operational environment are incompatible (operation 606—No), the system may proceed to operation 608 to cause an update the configurations of the SoC. Updating the configurations of the SoC may include disabling operation of the SoC. Additionally or alternatively, updating the configuration of the SoC may include assignment of a set of pins (e.g., one or more physical input/output ports) associated with the SoC to a set of functional blocks associated with the SoC, assignment of a set of roles to a set of registers associated with the SoC, assignment of a set of functional blocks associated with the SoC to a set of registers associated with the SoC, assignment of a set of roles to a set of bit registers associated with the SoC, assignment of one or more byte ordering formats to one or more data records stored on memory addresses associated with the SoC, or assignment of a behavioral profile to the SoC that defines which functionalities are enabled and/or disabled on the SoC. If the system determines that the expected operational environment and the observed operational environment are compatible (operation 606—Yes), the system may proceed to operation 610 to maintain the existing configurations of the SoC.

For example, the system may be configured to determine the persona associated with the SoC based on a detected operational environment (e.g., an expected geographic environment, an expected use case, an expected network environment, and/or the like) associated with the operation of the SoC. For example, in some cases, the system may switch to a persona that has higher security requirements (e.g., requires enablement of one or more encryption capabilities) when it is detected that the SoC is operating in a less secure environment. As another example, in some cases, the system may switch to a persona that provides higher bandwidth for QoS prioritization operations when it is detected that the SoC is operating in an environment in which higher level of QoS prioritization is recommended and/or required.

Figure 7:
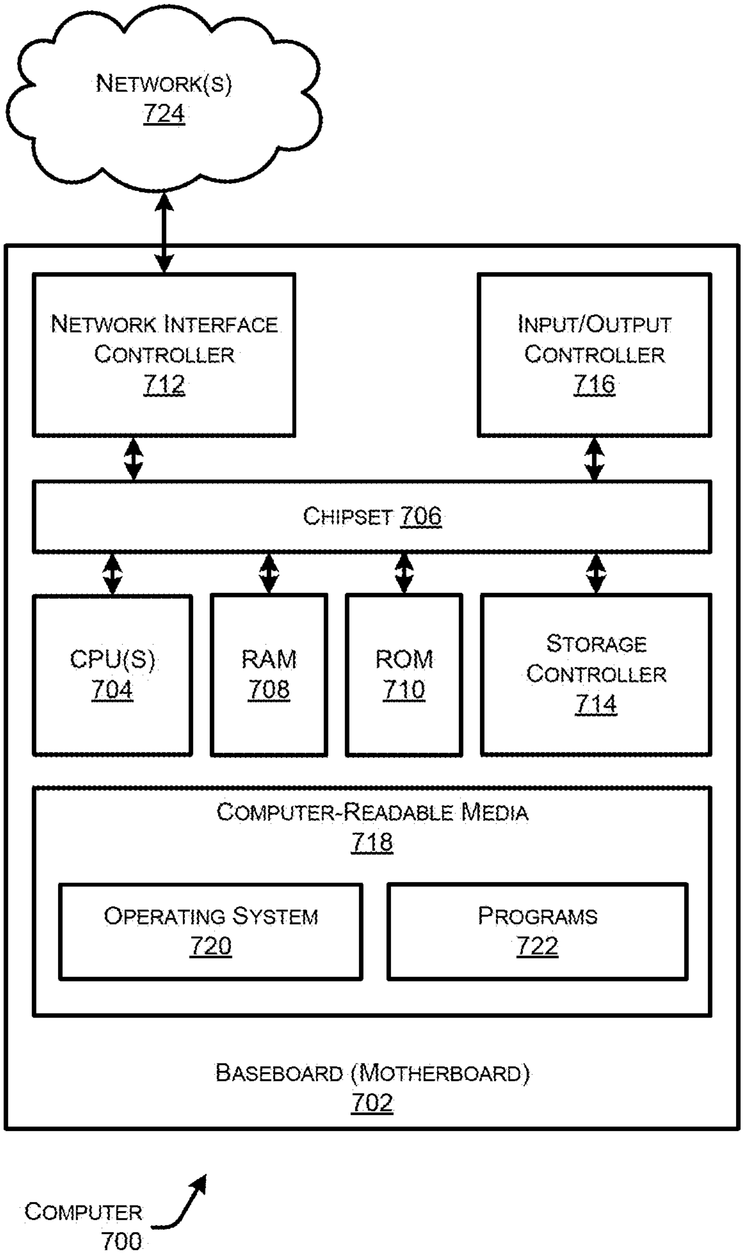
FIG. 7 shows an example computer architecture for a computer capable of executing program components for implementing the functionality described above.

FIG. 7 shows an example computer architecture for a computer 700 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein. The computer 700 may, in some examples, correspond to a physical server that is included in the SoC 102 described herein, and may comprise networked devices such as servers, switches, routers, hubs, bridges, gateways, modems, repeaters, access points, etc.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 724. The chipset 706 can include functionality for providing network connectivity through a NIC 712, such as a gigabit Ethernet adapter. The NIC 712 is capable of connecting the computer 700 to other computing devices over the network 724. It should be appreciated that multiple NICs 712 can be present in the computer 700, connecting the computer to other types of networks and remote computer systems.

The computer 700 can be connected to a storage device 718 that provides non-volatile storage for the computer. The storage device 718 can store an operating system 720, programs 722, and data, which have been described in greater detail herein. The storage device 718 can be connected to the computer 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, the operations are performed by devices in a distributed application architecture, and or any components included therein, may be supported by one or more devices similar to computer 700. Stated otherwise, some or all of the operations performed by the SoC 102, and or any components included therein, may be performed by one or more computers 700 operating in any system or arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the computer 700.

In one embodiment, the storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes described above with regard to FIGS. 1-7. The computer 700 can also include computer-readable storage media having instructions stored thereupon for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method of operating a system-on-chip (SoC), comprising:

receiving, by an isolated Root of Trust (ROT) code, an indication of a persona associated with the SoC, wherein the SoC is associated with a first configuration that assigns a first physical input/output pin of the SoC to a first functionality associated with the SoC and a second physical input/output pin of the SoC to a second functionality associated with the SoC;

based on receiving the indication of the persona, modifying, by the isolated ROT code, configuration data associated with the SoC, wherein modifying the configuration data comprises configuring a pin multiplexer of the SoC to:

disconnect the first physical input/output pin from the first functionality and connect the first physical input/output pin to the second functionality, and disconnect the second physical input/output pin from the second functionality and connect the second physical input/output pin to the first functionality;

subsequent to modifying the configuration data, enabling the SoC to operate in accordance with the configuration data;

determining, by the isolated RoT code, a first operational environment by monitoring the SoC;

determining, by the isolated ROT code, that the first operational environment is incompatible with a second operational environment associated with the persona; and modifying the configuration data to disable a third functionality, wherein the third functionality is associated with the first operational environment but lacks association with the second operational environment.

2. The method of claim 1, wherein:

the first configuration assigns a first register of the SoC to the first functionality and a second register of the SoC to the second functionality, and modifying the configuration data further comprises assigning the first register to the second functionality and the second register to the first functionality.

3. The method of claim 1, wherein:

the first configuration assigns a first register of the SoC to the first functionality, a first segment of the first register to a first setting associated with the first functionality, and a second segment of the first register to a second setting associated with the first functionality, and modifying the configuration data further comprises assigning the first segment to the second setting and the second segment to the first setting.

4. The method of claim 1, wherein:

the first configuration assigns a first behavioral profile to the SoC, wherein the first behavioral profile is associated with a third functionality; and modifying the configuration data further comprises disabling the first behavioral profile.

5. The method of claim 1, wherein:

the first configuration assigns a first interconnect setting to an interconnect component associated with the SoC, wherein the interconnect component is configured to route internal signals between a plurality of components of the SoC, and modifying the configuration data further comprises disabling the first interconnect setting.

6. The method of claim 1, wherein:

the first configuration assigns a byte ordering to a first memory location associated with the SoC, and modifying the configuration data comprises disabling the byte ordering in relation to the first memory location.

7. The method of claim 6, wherein the byte ordering represents at least one of a big-endian ordering or a little-endian ordering.

8. The method of claim 1, wherein:

the persona is associated with a first operational environment, wherein the first operational environment is defined based on at least one of a geographic region, a network type, or a system type; and the method further comprises:

detecting, by the isolated ROT code, that the SoC is operating outside of the first operational environment; and based on detecting that the SoC is operating outside the first operational environment, modifying the configuration data to disable the second configuration.

9. A system of operating a system-on-chip (SoC), the system comprising:

one or more processors; and one or more non-transitory computer-readable media storing computer-executable instructions that, when executed by the one or more processors, cause the one or more processors to perform operations comprising:

receiving, by an isolated Root of Trust (ROT) code, an indication of a persona associated with the SoC, wherein the SoC is associated with a first configuration that assigns a first physical input/output pin of the SoC to a first functionality associated with the SoC and a second physical input/output pin of the SoC to a second functionality associated with the SoC;

based on receiving the indication of the persona, modifying, by the isolated ROT code, configuration data associated with the SoC, wherein modifying the configuration data comprises configuring a pin multiplexer of the SoC to:

disconnect the first physical input/output pin from the first functionality and connect the first physical input/output pin to the second functionality, and disconnect the second physical input/output pin from the second functionality and connect the second physical input/output pin to the first functionality;

subsequent to modifying the configuration data, enabling the SoC to operate in accordance with the configuration data;

determining, by the isolated ROT code, a first operational environment by monitoring the SoC;

determining, by the isolated ROT code, that the first operational environment is incompatible with a second operational environment associated with the persona; and modifying the configuration data to disable a third functionality, wherein the third functionality is associated with the first operational environment but lacks association with the second operational environment.

10. The system of claim 9, wherein:

the first configuration assigns a first register of the SoC to the first functionality and a second register of the SoC to the second functionality, and modifying the configuration data further comprises assigning the first register to the second functionality and the second register to the first functionality.

11. The system of claim 9, wherein:

the first configuration assigns a first register of the SoC to the first functionality, a first segment of the first register to a first setting associated with the first functionality, and a second segment of the first register to a second setting associated with the first functionality, and modifying the configuration data further comprises assigning the first segment to the second setting and the second segment to the first setting.

12. The system of claim 9, wherein:

the first configuration assigns a first behavioral profile to the SoC, wherein the first behavioral profile is associated with a third functionality; and modifying the configuration data further comprises disabling the first behavioral profile.

13. The system of claim 9, wherein:

the first configuration assigns a first interconnect setting to an interconnect component associated with the SoC, wherein the interconnect component is configured to route internal signals between a plurality of components of the SoC, and modifying the configuration data further comprises disabling the first interconnect setting.

14. One or more non-transitory computer-readable media for operating a system-on-chip (SoC), the one or more non-transitory computer-readable media storing computer-executable instructions that, when executed by one or more processors, cause the one or more processors to perform operations comprising:

receiving, by an isolated Root of Trust (ROT) code, an indication of a persona associated with the SoC, wherein the SoC is associated with a first configuration that assigns a first physical input/output pin of the SoC to a first functionality associated with the SoC and a second physical input/output pin of the SoC to a second functionality associated with the SoC;

based on receiving the indication of the persona, modifying, by the isolated ROT code, configuration data associated with the SoC, wherein modifying the configuration data comprises configuring a pin multiplexer of the SoC to:

disconnect the first physical input/output pin from the first functionality and connect the first physical input/output pin to the second functionality, and disconnect the second physical input/output pin from the second functionality and connect the second physical input/output pin to the first functionality;

subsequent to modifying the configuration data, enabling the SoC to operate in accordance with the configuration data;

determining, by the isolated RoT code, a first operational environment by monitoring the SoC;

determining, by the isolated ROT code, that the first operational environment is incompatible with a second operational environment associated with the persona; and modifying the configuration data to disable a third functionality, wherein the third functionality is associated with the first operational environment but lacks association with the second operational environment.

15. The one or more non-transitory computer-readable media of claim 14, wherein:

the first configuration assigns a first register of the SoC to the first functionality and a second register of the SoC to the second functionality, and modifying the configuration data further comprises assigning the first register to the second functionality and the second register to the first functionality.

16. The one or more non-transitory computer-readable media of claim 14, wherein:

the first configuration assigns a first register of the SoC to the first functionality, a first segment of the first register to a first setting associated with the first functionality, and a second segment of the first register to a second setting associated with the first functionality, and modifying the configuration data further comprises assigning the first segment to the second setting and the second segment to the first setting.

17. The one or more non-transitory computer-readable media of claim 14, wherein:

the first configuration assigns a first behavioral profile to the SoC, wherein the first behavioral profile is associated with a third functionality; and modifying the configuration data further comprises disabling the first behavioral profile.

18. The one or more non-transitory computer-readable media of claim 14, wherein:

the first configuration assigns a first interconnect setting to an interconnect component associated with the SoC, wherein the interconnect component is configured to route internal signals between a plurality of components of the SoC, and modifying the configuration data further comprises disabling the first interconnect setting.

* * * * *